United States Patent [19]

Loter et al.

[11] 3,882,250

[45] May 6, 1975

[54] PREPARATION OF CHEESE

[75] Inventors: Ira Loter, Fair Lawn; Howard G. Dissly, Summit; Robert E. Schafer, Long Branch, all of N.J.

[73] Assignee: Diamond Shamrock Corporation, Cleveland, Ohio

[22] Filed: Nov. 7, 1973

[21] Appl. No.: 413,711

Related U.S. Application Data

[63] Continuation of Ser. No. 267,239, June 28, 1972, abandoned.

[52] U.S. Cl. ............ 426/39; 426/36; 426/40; 426/42
[51] Int. Cl. .......................................... A23c 19/02
[58] Field of Search ............ 426/39, 36, 356, 361

[56] References Cited
UNITED STATES PATENTS

| | | | |
|---|---|---|---|
| 3,298,836 | 1/1967 | Ernstrom | 426/39 |
| 3,406,076 | 10/1968 | Little | 426/39 |
| 3,620,768 | 11/1971 | Corbin, Jr. | 426/39 |

FOREIGN PATENTS OR APPLICATIONS

| | | |
|---|---|---|
| 1,247,415 | 1971 | United Kingdom |

*Primary Examiner*—David M. Naff
*Attorney, Agent, or Firm*—Leslie G. Nunn; Neal T. Levin

[57] ABSTRACT

Acid cheese curd is manufactured by acidifying milk at a temperature of 15°–30°C so that the pH is reduced to about 4.95–5.35 without precipitation of casein. Acidogen and proteolytic enzyme are then added to form the curd, which is then further processed to make various cheeses.

6 Claims, No Drawings

PREPARATION OF CHEESE

This is a continuation of application Ser. No. 267,239, filed June 28, 1972, now abandoned.

BACKGROUND OF THE INVENTION

1. Field of the Invention

This invention relates to an improved process for the manufacture of acid cheese curd in standard dairy equipment without using bacterial fermentation.

2. Description of the Prior Art

Various processes for preparing cheese from chemically acidified milk without using bacterial fermentation are known in the art. U.S. Pat. No. 2,982,654 (Hammond, et al.) teaches a process for making cheese curd wherein an acidogen is added to milk in conjunction with a proteolytic enzyme. However, in this process the use of acidogen alone, without first acidifying the milk, requires a long period of time to form a curd, thereby making it undesirable. U.S. Pat. No. 3,172,767 (Foster, et al.) teaches a process in which milk is acidified at 4°-5°C and then heated to 29°-82°C, whereupon a proteolytic enzyme is added, to produce a sweet cheese curd. This process, however, requires additional equipment for cooling the milk and does not produce an acid cheese curd. U.S. Pat. No. 3,406,076 (Little) teaches a process in which milk must be refrigerated before addition of acidogen, thus requiring additional equipment. U.S. Pat. No. 3,620,768 (Corbin) teaches the acidification of cold milk. British Pat. No. 1,247,415 (Battelle) also teaches the acidification of cold milk, and moreover states at page 3, lines 3 through 7, that: "It is well known that when milk is acidified at a temperature of about 70°F (21°C) to a pH of about 5.20 or below, it coagulates almost instantly into a granular water coagulation, totally unfit for making cheese." This disclosure is supported, generally, in "Principles of Dairy Chemistry" by Robert Jenness and Stuart Patton (John Wiley and Sons, New York, 1959) at page 310, where it is stated: ". . . the sensitivity of casein to coagulation by heat is enormously increased by decreasing the pH a few tenths of a unit below the normal value for milk."

In many of the above patents, heating of the acidified cold milk to a temperature high enough for coagulation must be accomplished while the milk is quiescent, and thus requires special and complex heating equipment.

SUMMARY OF THE INVENTION

An improved process has been invented for the production of acid cheese curd. This curd may then be further processed to yield cottage cheese, baker's cheese, creamed acid-curd cheeses such as quark, cream cheese, and Neufchatel cheese. The process involves acidifying milk at a temperature of about 15°-30°C so as to reduce its pH from a norm of about 6.7 to from about 4.95 to about 5.35,* without precipitating casein or denaturing the milk so that a curd will not subsequently form. Acidogen and proteolytic enzyme are then added to the warm acidified milk, which is maintained at the same temperature in a quiescent state for from about 30 minutes to 4 hours whereupon a curd is formed. This curd is then cut, cooked, and further processed in a conventional manner to produce the various types of cheese mentioned above. One of the major advantages of this process over the prior art is that the temperature of the milk remains approximately constant from the time the acidifying agent is added until the curd is formed, thus eliminating the need for complex temperature adjustment and special heating or cooling equipment.

*and preferably to from about 5.00 to about 5.20.

The successful acidification of milk at a temperature of about 15°C to about 30°C, and preferably at about 20°C to about 30°C, without causing coagulation was unexpected in view of the numerous teachings in the art that this was not possible. A primary factor is successful acidification is the avoidance of casein precipitation (acid coagulation) caused by excessive local acidity. Depending upon the conditions under which the milk is to be processed, various methods of acidification can be used. For example, the acidification can be successfully carried out in the laboratory using a small amount of milk under rapid agitation, such as in a blender, with concentrated acid such as 85 percent phosphoric being added directly into the milk container a drop at a time from a pipette. This is obviously impractical for dairy production and it has been found that the best means of acidifying the milk for commercial production is to introduce a diluted acid into the stream of a recirculating pipe at a uniform rate while keeping a constant reading of the pH of the milk from a meter inserted in the pipeline after the point of introduction, or in the vat. The acid can be introduced by any conventional metering device or more simply can be drawn into the recirculating pipe using a standard Bernoulli connection, in which case the diameter of the connecting tube will determine the rate of the addition of the acid. A change in any one of the variables in the acidification can be easily compensated by adjusting various of the other variables. For example, if the temperature of the milk is at the low end of the range (slightly above 15°C), a somewhat more concentrated acid solution can be introduced, or the rate of addition of the acid can be more rapid, or both of these factors can be varied. These factors may all be varied within the limits of this invention up to the point where casein begins to precipitate. Taking another example, if the acid introduced is cold and at a 10 percent dilution, then it could be introduced into the milk more rapidly, or it could be introduced at a higher temperature (approaching 30°C), or both of these latter factors could be varied as indicated, but to a lesser degree.

With proper equipment and after modest experimentation, it is possible to have a continuous introduction of acid until the milk reaches the desired pH. It has been discovered, however, that a preferred method of acidification is to lower the pH to about 5.15 to 5.20 (at a temperature of about 20°C to about 30°C) and then reduce the rate of introduction of acid until the pH has dropped to about 5.10. The reduction of the rate of flow of acid allows careful monitoring of the pH and it must be noted that milk at the temperatures used in the process of this invention is sensitive to even minor adjustments of pH. There is no specific time limit for the acidification of the milk since the milk will not coagulate upon standing without the addition of an acidogen and a proteolytic enzyme, provided that the temperature is not raised. Obviously, the time for introduction of the acid can be minimized by holding the milk at the lowest temperature and by increasing the rate of flow or agitation of the milk to which the acid is being added. The balance of all of the variable factors best suited for commercial production at a given location can easily be determined by modest experimentation.

DESCRIPTION OF THE PREFERRED EMBODIMENTS

This invention can be used to manufacture cottage cheese, baker's cheese, quark, cream cheese, Neufchatel cheese, and the like, from milk. By milk is meant fresh skim milk, skim milk having about 1–4 percent by weight or more added NFMS (Grade A, Low Heat, nonfat-milk-solids), whole milk, milk-cream mixtures, half milk and half cream, reconstituted condensed milk, reconstituted powdered milk and the like. Milk is used as a generic term in the present invention and includes medium and high butterfat milk or cream having as much as 20 percent butterfat.

The milk is initially acidified with a 10-90 percent aqueous solution of at least one food grade free acid such as lactic acid, phosphoric acid, citric acid, acetic acid, malic acid, sulfuric acid, hydrochloric acid, succinic acid or the like. This acidification of the milk is conducted at a temperature of about 15°C to about 30°C with the optimum temperature being about 20°C to about 30°C to achieve a pH of about 4.95 to about 5.35 with the optimum pH being about 5.00 to about 5.20. Generally, a total of from about 0.3 to about 1.0 parts by weight of acid based on 100 parts by weight of milk is added. The manner in which milk is initially acidified is critical to this invention. Addition of the acid all at once, or undiluted, or gradual addition of the acid to quiescent milk, will all result in clotting or premature (acid) coagulation. Only a uniform addition of the diluted acid to vigorously flowing or agitated milk will allow the milk to become acidified to the desired pH at the desired temperature, without precipitation of casein or alteration so that a curd will not form.

The milk is maintained at about the same temperature as during acidification, and from about 0.25 to about 1.0 parts by weight of at least one acidogen based on 100 parts by weight of milk, and from about 0.015 to about 0.05 parts by weight of aqueous proteolytic enzyme solution based on 100 parts by weight of milk, are added to the milk. The resulting mixture is agitated during and after acidogen and enzyme addition until uniform. The milk is then further maintained at about the same temperature while quiescent until the acid liberated from the acidogen and the action of the proteolytic enzyme both bring about coagulation of the milk. It takes from about 30 minutes to about 4 hours after addition of the acidogen and proteolytic enzyme for a cuttable cheese curd to form.

An acidogen such as D-glucono-delta-lactone, the low melting lactide (m.p. 41°–42°C.) of lactic acid, acetic anhydride, heptonolactone (the lactone of glucoheptonic acid) or the like can be used. Preparation of the low melting lactic acid lactide is described in U.S. Pat. No. 2,982,654, Hammond and Deane, filed Apr. 6, 1959.

The proteolytic enzyme can be commercial rennin, a diluted rennin extract, a pepsin-rennin mixture, a vegetable-derived enzyme clotting agent or the like. Other enzymes such as pepsin, papain and ficin may be used alone or in combination with rennin, the preferred enzyme. The rennin extract is usually a solution of the enzyme rennin, stabilized and with preservatives added, and standardized in strength to a certain coagulating or clotting power. Another enzyme that may be used is that produced by pure culture fermentation of the organism Mucor Miehei. This latter enzyme is available commercially in units standardized to rennin extract.

It should be noted that the choices of acid for initial acidification, or of acidogen, or of proteolytic enzyme, are not critical to this invention, and may be any of those enumerated above, or any others known to the dairy industry.

The cheese curd is then cut and cooked in a conventional manner. It can be cut into large (¾-inch, ⅝-inch, ½-inch) or small (⅜-inch or ¼-inch) cubes. The cooking rate in the process of this invention is usually faster than the cooking rate in the cultured process. Draining and washing of the cooked curd can be carried out using the standard cheese-making procedures.

To make cottage cheese, the acid cheese curd is processed with the additional steps of:
1. cutting the curd into cubes,
2. expressing the whey from the curd,
3. cooking and stirring the curd for from about 30 minutes to about 90 minutes at a temperature of from about 38°C to about 65°C, and
4. washing and draining the curd.

To make baker's cheese, the acid cheese curd is processed with the additional steps of:
1. breaking up the curd,
2. setting the curd and expressing the whey, and
3. hanging and draining the curd for about 1 hour, to help express further whey.

To make Neufchatel cheese or cream cheese, the acid cheese curd is processed with the additional steps of:
1. cutting the curd,
2. cooking and stirring the curd until the temperature reaches about 55°C and then continuing cooking for about 15 additional minutes,
3. cooling the curd to about 15°C,
4. draining the curd overnight at about 3°–4°C to obtain a dry, soft curd,
5. mixing the dry, soft curd with sufficient lactic acid to reduce the pH of the curd to 4.60 and
6. blending the curd into a smooth homogenous cheese mass.

In making cream cheese, the original milk should contain enough cream so as to have a fat content of about 10.5 to about 11.5 percent. In making Neufchatel cheese, the original milk should contain enough cream so as to have a fat content of about 5 to about 6 percent.

In the following examples, approximate equivalent metric units are given in parentheses after the American units with which the experiments were conducted. Unit abbreviations are: gallons = gal.; liters = l.; milliliters = ml.; pounds = lbs.; kilograms = kg.; grams = g.; °C = degrees Centigrade; and °F = degrees Fahrenheit.

EXAMPLE 1

20 gal. (76 l.) of fortified skim milk were prepared from 10 gal. (38 l.) of skim milk to which was added 8.5 lbs. (3.9 kg.) instant non-fat milk solids dissolved in 77.5 lbs. (35.2 kg.) of water. The milk was warmed to 76°F (24.5°C) by circulating warm water through the jacket of the cheese vat in which the fortified milk was prepared. The pH was 6.7. The milk was recirculated through a centrifugal pump with a tee (Bernoulli) connection placed at the suction side of the pump so that acid could be injected into the milk. The speed of the pump caused acid to be sucked in at the impeller of the pump. The milk was then discharged to the rear of the cheese vat and recirculated. The acid was 85 percent phosphoric acid diluted with 3 volumes of water. The acid was introduced into the milk flow in four steps as follows. In the first step 400 ml. of acid was introduced during a 6 minute 8 second period, reducing the pH to 5.60. In the second step 325 ml. of acid was introduced during a 12 minute 54 second period further reducing the pH to 5.11. In the third step 50 ml. of acid was introduced during a 4 minute 20 second period reducing the pH to 5.10. In the fourth step 36 ml. of acid was introduced during an 8 minute 4 second period reducing the pH to 5.03, its lowest value. The milk at this stage showed no signs of precipitation. 15 g. of $CaCl_2 \cdot H_2O$ dissolved in 30 ml. of water, followed by 228 g. of D-glucono-delta-lactone and 24 ml. of rennin coagulator dissolved in 500 ml. of water, were added to the fortified skim milk. The milk was then allowed to set in a quiescent state for 1 hour and 20 minutes while maintained at the original temperature of 76°F (24.5°C). A firm curd resulted which was cut in the conventional manner by cheese knives. The pH of the whey was 4.78. A mixture of 11 ml. phosphoric acid in 1 pint (.75 l.) of water was added to the whey to reduce the pH to 4.60. The curd was cooked to 120°F (49°C) for 1 hour, drained and washed in the usual manner. After draining for 45 minutes, the yield of curd was 25.25 lbs. (11.5 kg.). The curd manufacturing process used in this example was within the scope of this invention.

EXAMPLE II

Cheese was prepared using commercial dairy equipment set up in the following manner. A 150 gal. (570 l.) storage vat was connected by piping to a centrifugal pump which was connected by further piping to a 200 gal. (760 l.) cheese vat. Means for injecting acid into the pipe was attached between the pump and the cheese vat (i.e., the receiving vat) and a pH meter was introduced into the piping between the point of introduction of the acid and the cheese vat.

Firstly, the equipment was calibrated by pumping 10 gal. (38 l.) of water from one tank to the other. This took 15 seconds which is equivalent to 40 gal. (152 l.) per minute. This was calculated to be the equivalent of 37–38 gal./minute (140.6–144.4 l./minute) of milk. Accordingly, it was further calculated that the addition of 1 gal. (3.8 l.) of 85 percent phosphoric acid diluted with 3 parts water per 100 gal. (380 l.), or 1,440 ml. of dilute acid per minute would be required. As a safety factor, only 95 percent of this quantity or about 1,360 ml. per minute was added.

The acid injection means was set to deliver 1,360 ml. per minute dilute acid and it was calculated that this volume of acid to 38 gal. (188.4 l.) of milk should lower the pH to 5.20.

The milk used had a Quevenne Lactometer (milk specific gravity tester) reading of 37.5 at 60°F (11.5°C), which is equivalent to a specific gravity of 1.0375. Non-fat milk solids were about 9.4 percent. 150 gal. (570 l.) of milk were poured into the storage vat and warmed to 72°F (22°C). The valves were opened and the centrifugal pump was started. The pH meter was read at the discharge point into the vat and indicated 4.9 with the milk precipitating. The rate of introduction of the dilute acid was slowly decreased until the pH of the milk at the discharge point read about 5.2, and the casein no longer precipitated. The total time to empty the vat of milk was 4 minutes 25 seconds, which meant that the rate was 33.5 gal./minute (127 l./minute) and not the 38 gal./minute (144.4 l./minute) originally assumed. This discrepancy may be due to the use of a centrifugal pump rather than a positive pump. A centrifugal pump's delivery rate often depends upon the head pressure of the liquid. This would account for the initial precipitation. The total volume of acid injected was 4,820 ml. The pH of the milk equilibrated to 5.25 without any visible precipitation.

While maintaining the milk at the same temperature of 72°F (22°C), it was set with 6 lbs. (2.7 kg.) D-glucono-delta-lactone dissolved in 5 gal. (19 l.) water to which was then added 7½ ounces (221.8 ml.) rennin coagulator. The milk was set for 1.5 hours while maintained quiescent and at the same temperature, and then cut. The coagulum was very good and was easily cut with half inch knives. The whey pH was 4.90. 150 ml. of 85 percent phosphoric acid in 10 gal. (38 l.) of water at 90°F (32°C) was poured into the vat gently. After gentle stirring, the pH of the whey was 4.60. The curd was then cooked out to 102°F (39°C) in 1 hour. It was then drained and washed in the usual manner. This process was within the scope of this invention and the curd was suitable for use in the manufacture of any of the cheeses to which this invention relates.

EXAMPLE III 1 quart (.95 l.) of skim milk containing 1 percent added non-fat milk solids was warmed to 80°F (26.5°C) in a warm water bath and held at that temperature. With vigorous agitation, a solution of 1 part of 85 percent phosphoric acid and 3 parts of water was slowly added dropwise in increments with the following results:

| Total Volume of Acid (ml.) | pH after acid addition | pH after 5 minutes stirring | Results |
|---|---|---|---|
| 0.0 | 6.7 | — | no precipitate |
| 2.0 | 6.1 | — | " |
| 4.0 | 5.65 | — | " |
| 5.0 | 5.50 | — | " |
| 6.0 | 5.35 | 5.40 | " |
| 6.5 | 5.30 | — | " |
| 7.0 | 5.22 | 5.22 | " |
| 7.5 | 5.19 | 5.20 | " |
| 8.0 | 5.11 | 5.12 | " |
| 8.5 | 5.06 | 5.08 | " |
| 9.0 | 5.00 | 5.01 | trace of precipitate |

The total time for addition of the acid was about 45 minutes. Acid addition was stopped when a trace of precipitation became discernable. A solution of 3.36 g.

of D-glucono-delta-lactone and 0.3 ml. of rennin coagulator (Hansen's Standard Strength) was added to the acidified milk which was allowed to set for 1 hour. Although a trace of precipitate was visible at the surface, a good curd was cut, which was cooked out in the usual manner. The pH of the whey was 4.9. This indicates that at the given temperature and rate of acid addition, milk could successfully be acidified to a pH of just above 5.01.

EXAMPLE IV

Using the same procedure as Example III, 2 quarts (1.9 l.) of skim milk to which 0.4 g. $CaCl_2.H_2O$ had been added, and having a pH of 6.65, was heated to 80°F (26.5°). An attempt was made to increase the rate of acid addition. In the first step 13.5 ml. of diluted acid was added over a 1 minute 5 second period resulting in a milk pH of 5.32 and no precipitate. In the second step 4.5 ml. of diluted acid was added over a 25 second period resulting in a pH of 5.20 and a precipitate. It was concluded that the milk had precipitated because the acid was added too quickly.

EXAMPLE V

Example IV was repeated with a slower second step addition of acid. In the first step 13.5 ml. of diluted acid was added over a 1 minute 14 second period resulting in a milk pH of 5.34 and no precipitate. In the second step 4.5 ml. of diluted acid was added over a 1 minute 40 second period resulting in a milk pH of 5.08 and a precipitate. It was concluded that at a temperature of 80°F (26.5°C) this rate of acid addition was still too rapid.

EXAMPLE VI

Example IV was repeated with a 3-step addition of acid. In the first step 14 ml. of acid was added over a 1 minute 25 second period resulting in a milk pH of 5.40 and no precipitate. In the second step 3 ml. of acid was added over a 2 minute 26 second period resulting in a milk pH of 5.15 and no precipitate. In the third step 1 ml. of acid was added over a 1 minute 45 second period resulting in a milk pH of 5.10 and no precipitate. This indicates that at the given temperature and agitation, a slow rate of acid addition was required. This process was within the scope of this invention.

EXAMPLE VII

Example IV was repeated with a two-step addition in which a larger amount of the total acid was introduced in the first step. In the first step 15 ml. of acid was added over a 1 minute 46 second period resulting in a milk pH of 5.25 and no precipitate. In the second step 3 ml. of acid was added over a 58 second period resulting in a milk pH of 5.11 and no precipitate. After 45 minutes the pH of the milk had equiliberated to 5.18 and there was still no precipitate. This indicates that the most critical point of acid addition is when the lowest pH is approached. This process was within the scope of this invention.

EXAMPLE VIII

Milk was prepared entirely from non-fat milk solids by slowly adding 186 g. of non-fat milk solids to 1,1814 ml. of water at 80°F (26.5°C). This resulted in a 9 percent solids milk. 0.4 g. of $CaCl_2.H_2O$ was added to the milk, after which the pH was 6.68. The milk was then acidified with 85 percent phosphoric acid diluted 3:1 with water. In the first step 14.5 ml. of acid was added over a 1 minute 36 second period resulting in a pH of 5.29 and no precipitate. In the second step 3.5 ml. of acid was added over a 1 minute 7 second period resulting in a pH of 5.12 and no precipitate. In the third step 0.5 ml. of acid was added over a 12 second period resulting in a pH of 5.10 and no precipitate. It was decided to try to reduce the milk pH even further, so in a fourth step 1.0 ml. of acid was added over a 15 second period resulting in a pH of 5.07 and still no precipitate. The milk had a good, clean appearance and after 15 minutes continued stirring the pH had equiliberated at 5.09. The temperature of 80°F (26°C) was maintained throughout the experiment. This process was within the scope of this invention.

EXAMPLE IX

An attempt was made to repeat Example VIII using less acid and with hand agitation (stirring). In the first step 5 ml. of acid was added resulting in a milk pH of 5.58 and no precipitate. In the second step 4 ml. of acid was added resulting in a milk pH of 5.10 and a precipitate. Since a precipitate resulted in this experiment even though the pH was higher than that of the preceding experiment, it was concluded that hand agitation of the milk was too slow at the temperature at which the milk was acidified.

EXAMPLE X

A large scale laboratory experiment was set up in which milk was pumped from a 50 gal. (190 l.) processing vat by a centrifugal pump through piping into a cheese vat. Means for introducing acid into the pipe were located between the centrifugal pump and the cheese vat. The means for introducing the acid was calibrated to introduce 700 ml. of acid per 20 gal. (76 l.) of milk and the centrifugal pump was set to transfer 40 gal. (152 l.) per minute.

The acid used was 85 percent phosphoric acid diluted 3:1 to water. The skim milk was made by dissolving 38.8 lbs. (17.6 kg.) of instant non-fat milk solids in 348 lbs. (158.2 kg.) of water at 69°F (20.5°C). The temperature of the mixture rose to 71°F (21.5°C) and 35 g. of $CaCl_2.H_2O$ were added. The system was then started and after 1 minute 40 gal. (152 l.) of milk had been pumped into the cheese vat admixed with 1,450 ml. of acid. The pH of the acidified milk in the cheese vat was 5.20. The milk was very clean and fluid in appearance. The piping was then disconnected from the processing vat and connected to the drain of the cheese vat so as to form a recirculating system. 100 ml. of additional acid was added to the system over a 39 second period resulting in a milk pH of 5.12 and no precipitate. 50 ml. of additional acid was then introduced over a 25 second period resulting in milk pH of 5.08 and still no precipitate. The temperature of the milk throughout the time of acid addition was maintained at 72°F (22°C).

500 g. of D-glucono-delta-lactone was dissolved in 500 ml. of water at 80°F (26.5°C), and mixed with 54 ml. of rennin coagulant. The mixture was then added to the milk. Three small samples of milk were removed in order to check the curd tension. The first sample was tested at the end of 1 hour at which time the curd tension was 12 g. and the pH was 4.85. The second sample was tested at the end of 1 hour 15 minutes at which time the curd tension was 12 g. The third sample was tested at the end of 1 hour 30 minutes at which time the curd tension was 14-15 g. and the pH was 4.85. The milk was maintained throughout the setting period at the same temperature as when the acid was introduced.

After 1 hour 30 minutes a very good curd was formed which cut extremely well. The whey pH was 4.85. 30 ml. of 85 percent phosphoric acid dissolved in 2,000 ml. of water was added to the surface of the whey and stirred in gently, resulting in a pH of 4.55. The curd was cooked out as usual to 119°F (48.5°C ) in 1 hour. The curd was drained and water was added to reduce the temperature to 84°F (29.9°C). The curd was again drained and additional water was added to reduce the temperature to 64°F (18°C). The curd was then drained for a third time and ice water was added to bring the temperature down to 47°F (8°C). After draining for 45 minutes the yield of curd was 51 lbs. (20.5 kg.). This process was within the scope of this invention.

We claim:

1. An acid cheese curd making process comprising:
   A. acidifying milk under vigorous agitation and at a temperature of about 20°C to about 30°C with from about 0.3 to about 1.0 parts by weight of 10 to 90 percent free acid aqueous solution per 100 parts by weight of milk to obtain an acidified milk with a pH reduced to about 5.15 and then adding additional free acid aqueous solution at a slower rate until the pH of the milk is reduced to about 5.00, without coagulation of the milk and with the further proviso that all of the acid is not added to the milk at the same time; then
   B. maintaining the acidified milk at about the same temperature and adding thereto from about 0.25 to about 1.0 parts by weight of acidogen and from about 0.015 to about 0.050 parts by weight of proteolytic enzyme, per 100 parts by weight of milk; and thereafter
   C. allowing the milk to stand quiescent at about the same temperature for from about 30 minutes to about 4 hours, so as to form an acid cheese curd suitable for making cottage cheese, baker's cheese, quark cheese, cream cheese, and Neufchatel cheese.

2. The process of claim 1 with the additional steps of:
   a. cutting the curd into cubes;
   b. expressing the whey from the curd;
   c. cooking and stirring the curd for from about 30 minutes to about 90 minutes at a temperature of from about 38°C to about 65°C; and
   d. washing and draining the curd, to obtain a cottage cheese curd.

3. The process of claim 1 in which the acidification is continuous and at a decreasing rate until the desired pH is reached.

4. The process of claim 1 in which the acidification is in three steps.

5. An acid cheese curd making process comprising:
   A. acidifying milk under vigorous agitation and at a temperature of about 26.5°C with from about 0.3 to about 1.0 parts by weight of 10 to about 90 percent free acid aqueous solution per 100 parts by weight of milk to obtain an acidified milk with a pH reduced to about 5.00, without coagulation of the milk and with the further proviso that all of the acid is not added to the milk at the same time; then
   B. maintaining the acidified milk at about the same temperature and adding thereto from about 0.25 to about 1.0 parts by weight of acidogen and from about 0.015 to about 0.050 parts by weight of proteolytic enzyme, per 100 parts by weight of milk; and thereafter
   C. allowing the milk to stand quiescent at about the same temperature for from about 30 minutes to about 4 hours, so as to form an acid cheese curd suitable for making cottage cheese, baker's cheese, quark cheese, cream cheese, and Neufchatel cheese.

6. An acid cheese curd making process comprising:
   A. acidifying milk under vigorous agitation and at a temperature of about 16.5°C with from about 0.3 to about 1.0 parts by weight of 10 to about 90 percent free acid aqueous solution per 100 parts by weight of milk to obtain an acidified milk with a pH reduced to about 5.15, without coagulation of the milk and with the further proviso that all of the acid is not added to the milk at the same time; then
   B. maintaining the acidified milk at about the same temperature and adding thereto from about 0.25 to about 1.0 parts by weight of acidogen and from about 0.015 to about 0.050 parts by weight of proteolytic enzyme, per 100 parts by weight of milk; and thereafter
   C. allowing the milk to stand quiescent at about the same temperature for from about 30 minutes to about 4 hours, so as to form an acid cheese curd suitable for making cottage cheese, baker's cheese, quark cheese, cream cheese, and Neufchatel cheese.

* * * * *